US012053696B2

(12) United States Patent
Wan et al.

(10) Patent No.: US 12,053,696 B2
(45) Date of Patent: Aug. 6, 2024

(54) OPERATION CONTROL DISPLAY METHOD AND APPARATUS BASED ON VIRTUAL SCENE

(71) Applicant: TENCENT TECHNOLOGY (SHENZHEN) COMPANY LIMITED, Shenzhen (CN)

(72) Inventors: Yulin Wan, Shenzhen (CN); Xun Hu, Shenzhen (CN); Jianmiao Weng, Shenzhen (CN); Shandong Su, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 328 days.

(21) Appl. No.: 17/501,989

(22) Filed: Oct. 14, 2021

(65) Prior Publication Data
US 2022/0032186 A1 Feb. 3, 2022

Related U.S. Application Data

(63) Continuation of application No. PCT/CN2021/079516, filed on Mar. 8, 2021.

(30) Foreign Application Priority Data

Apr. 23, 2020 (CN) .......................... 202010329239.9

(51) Int. Cl.
*A63F 13/52* (2014.01)
*A63F 13/56* (2014.01)
(Continued)

(52) U.S. Cl.
CPC .............. *A63F 13/52* (2014.09); *A63F 13/56* (2014.09); *G06F 3/0484* (2013.01); *G06T 7/70* (2017.01);
(Continued)

(58) Field of Classification Search
CPC ........ G06F 3/0484; A63F 13/52; A63F 13/56; G06T 7/70; G06T 2200/24; G06T 2207/30242; G06V 10/22
See application file for complete search history.

(56) References Cited

U.S. PATENT DOCUMENTS 5,044,956 A * 9/1991 Behensky ............... A63F 13/57
434/45
5,616,079 A 4/1997 Wase et al.
(Continued)

FOREIGN PATENT DOCUMENTS

CN 107398071 A 11/2017
CN 107837531 A 3/2018
(Continued)

OTHER PUBLICATIONS

The European Patent Office (EPO) The Extended European Search Report for 21786075.8 Jun. 2, 2022 10 pages.
(Continued)

*Primary Examiner* — Steve Rowland
(74) *Attorney, Agent, or Firm* — ANOVA LAW GROUP, PLLC

(57) ABSTRACT

An operation control display method is provided to be applied to a computing device. The method includes: obtaining position information of a target virtual object in the virtual scene, the target virtual object being a virtual object controlled by a terminal; determining, based on the position information and at least one of virtual elements in the virtual scene, an element type of a target virtual element corresponding to the target virtual object; and displaying, in a control display region in the virtual scene, a target operation control corresponding to the element type of the target
(Continued)

virtual element, the target operation control being configured to control the target virtual object to interact with the target virtual element.

20 Claims, 8 Drawing Sheets

(51) Int. Cl.
  *G06F 3/0484* (2022.01)
  *G06T 7/70* (2017.01)
  *G06V 10/22* (2022.01)
(52) U.S. Cl.
  CPC .......... *G06V 10/22* (2022.01); *G06T 2200/24* (2013.01); *G06T 2207/30242* (2013.01)

(56) References Cited

U.S. PATENT DOCUMENTS

| | | | | |
|---|---|---|---|---|
| 5,742,278 | A * | 4/1998 | Chen | G05G 9/047 345/157 |
| 8,210,943 | B1 * | 7/2012 | Woodard | A63F 13/69 463/2 |
| 10,444,871 | B2 | 10/2019 | Wang | |
| 10,500,484 | B2 | 12/2019 | Li | |
| 10,500,493 | B2 | 12/2019 | Wei | |
| 2001/0045941 | A1 * | 11/2001 | Rosenberg | A63F 13/23 345/161 |
| 2004/0043805 | A1 * | 3/2004 | Sonoda | A63F 13/45 463/1 |
| 2004/0160415 | A1 * | 8/2004 | Rosenberg | G05G 9/047 345/156 |
| 2005/0014561 | A1 * | 1/2005 | Ouchi | A63F 13/285 463/36 |
| 2009/0181736 | A1 * | 7/2009 | Haigh-Hutchinson | A63F 13/55 463/2 |
| 2009/0184921 | A1 * | 7/2009 | Scott | G06F 1/1626 345/156 |
| 2009/0305758 | A1 | 12/2009 | Nomura | |
| 2011/0256930 | A1 * | 10/2011 | Jaouen | A63F 13/803 463/37 |
| 2013/0316813 | A1 | 11/2013 | Derome et al. | |
| 2014/0237408 | A1 | 8/2014 | Ohlsson et al. | |
| 2014/0370479 | A1 * | 12/2014 | Gazzaley | G09B 5/02 434/322 |
| 2015/0268725 | A1 * | 9/2015 | Levesque | G06F 3/041 345/156 |
| 2017/0361230 | A1 | 12/2017 | Tang et al. | |
| 2018/0253760 | A1 | 9/2018 | Tenkorang | |
| 2018/0280800 | A1 | 10/2018 | Fujikawa et al. | |
| 2019/0250714 | A1 | 8/2019 | Katz et al. | |
| 2020/0276499 | A1 * | 9/2020 | Black | A63F 13/285 |
| 2021/0245061 | A1 * | 8/2021 | Kaushik | A63F 13/5375 |
| 2023/0245175 | A1 * | 8/2023 | Schaeppi | G06Q 30/0269 705/14.66 |
| 2023/0341574 | A1 * | 10/2023 | Harney | G01V 1/003 |
| 2023/0343226 | A1 * | 10/2023 | Bieringer | G08G 5/0017 |

FOREIGN PATENT DOCUMENTS

| | | |
|---|---|---|
| CN | 108744510 A | 11/2018 |
| CN | 109589605 A | 4/2019 |
| CN | 110413171 A | 11/2019 |
| CN | 110427111 A | 11/2019 |
| CN | 110743168 A | 2/2020 |
| CN | 111013142 A | 4/2020 |
| CN | 111589128 A | 8/2020 |
| JP | 2009291426 A | 12/2009 |
| JP | 2018077126 A | 5/2018 |
| JP | 2018525056 A | 9/2018 |

OTHER PUBLICATIONS

Intellectual Property Office of Singapore Search report for Application No. 11202111645S Mar. 8, 2021 2 pages.
Japan Patent Office (JPO) The Office Action for JP Application No. 2021-565788 Nov. 14, 2022 6 Pages (Translation Included).
The State Intellectual Property Office of the People's Republic of China (SIPO) Office Action 1 for for 202010329239. Mar. 9, 24, 2021 9 Pages (including translation).
The World Intellectual Property Organization (WIPO) International Search Report for PCT/CN2021/079516 Jun. 2, 2021 8 Pages (including translation).
Ewdison Then, "League of Legends Wild Rift is a separate LoL for mobile and consoles", SlashGear, Oct. 15, 2019, Retrieved from the Internet:URL: https://www.slashgear.com/league-of-legends-wild-rift-is-a-separate-lol-for-mobile-and-consoles-15595709. 7 pages.
Korean Intellectual Property Office (KIPO) Request for the Submission of an Opinion for 10-2021-7035221 Oct. 17, 2023. 22 Pages (including translation).

* cited by examiner

OPERATION CONTROL DISPLAY METHOD AND APPARATUS BASED ON VIRTUAL SCENE

RELATED APPLICATION

This application is a continuation application of PCT Patent Application No. PCT/CN2021/079516 filed on Mar. 8, 2021, which claims priority to Chinese Patent Application No. 202010329239.9, entitled "OPERATION CONTROL DISPLAY METHOD AND APPARATUS BASED ON VIRTUAL SCENE" filed on Apr. 23, 2020, all of which are incorporated by reference in entirety.

FIELD OF THE TECHNOLOGY

The present disclosure relates to the field of computer technologies, and in particular, to an operation control display method and apparatus based on a virtual scene, a device, and a storage medium.

BACKGROUND

With the development of computer technologies and diversification of terminal functions, an increasing quantity of mobile games emerge, where role-playing games (RPGs) gradually become an important category of the mobile games. In the current RPGs, a player may control a respective virtual object to perform a movement in a virtual scene, and interact with other virtual elements in the virtual scene. The virtual scene may include various types of virtual elements, and the player may need to use different operation controls when interacting with different types of virtual elements.

SUMMARY

Embodiments of the present disclosure provide an operation control display method and apparatus based on a virtual scene, a device, and a storage medium, and the technical solutions are as follows:

In one aspect, the present disclosure provides an operation control display method based on a virtual scene is provided, and is applied to a computing device, the method including: obtaining position information of a target virtual object in the virtual scene, the target virtual object being a virtual object controlled by a terminal; determining, based on the position information and at least one of virtual elements in the virtual scene, an element type of a target virtual element corresponding to the target virtual object; and displaying, in a control display region in the virtual scene, a target operation control corresponding to the element type of the target virtual element, the target operation control being configured to control the target virtual object to interact with the target virtual element.

In another aspect, the present disclosure provides an operation control display apparatus based on a virtual scene, the apparatus including: a memory storing computer program instructions; and a processor coupled to the memory and configured to execute the computer program instructions and perform: obtaining position information of a target virtual object in the virtual scene, the target virtual object being a virtual object controlled by a terminal; determining, based on the position information and at least one of virtual elements in the virtual scene, an element type of a target virtual element corresponding to the target virtual object; and displaying, in a control display region in the virtual scene, a target operation control corresponding to the element type of the target virtual element, the target operation control being configured to control the target virtual object to interact with the target virtual element.

In yet another aspect, the present disclosure provides a non-transitory computer-readable storage medium storing computer program instructions executable by at least one processor to perform: obtaining position information of a target virtual object in a virtual scene, the target virtual object being a virtual object controlled by a terminal; determining, based on the position information and at least one of virtual elements in the virtual scene, an element type of a target virtual element corresponding to the target virtual object; and displaying, in a control display region in the virtual scene, a target operation control corresponding to the element type of the target virtual element, the target operation control being configured to control the target virtual object to interact with the target virtual element.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
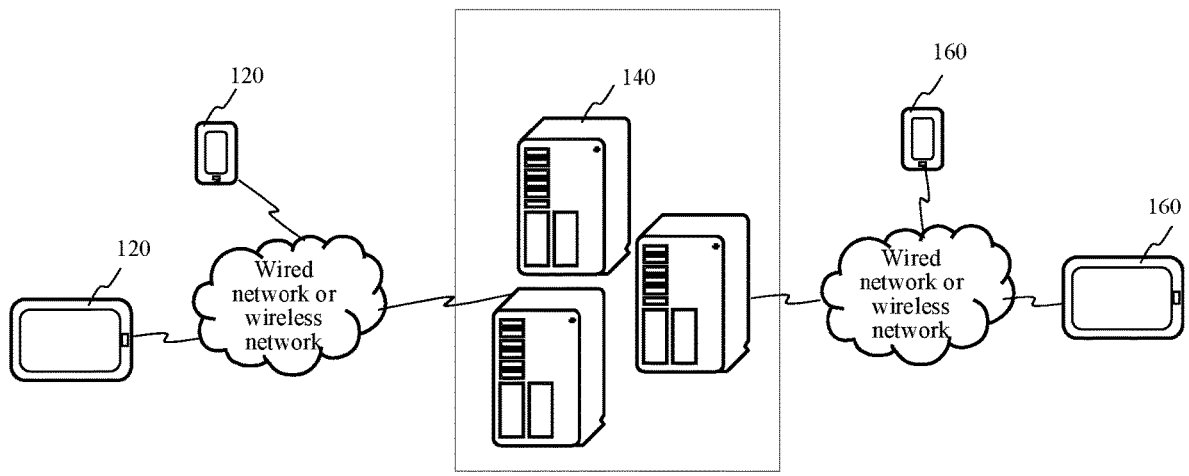
FIG. 1 is a schematic diagram of an implementation environment of an operation control display method based on a virtual scene according to one or more embodiments of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In certain embodiments, the term "based on" is employed herein interchangeably with the term "according to."

For convenience of understanding the technical processes of the embodiments of the present disclosure, terms related in the embodiments of the present disclosure are described below.

Virtual scene: A virtual scene is displayed (or provided) when an application program is run on a terminal. The virtual scene may be a simulated environment of a real world, or may be a semi-simulated and semi-fictional virtual environment, or may be a completely fictional virtual environment. The virtual scene may be any one of a two-dimensional virtual scene, a 2.5-dimensional virtual scene, and a three-dimensional virtual scene. This is not limited in the present disclosure. For example, the virtual scene may include the sky, the land, the ocean, or the like. The land may include environmental elements such as the desert and a city. A user may control a virtual object perform a movement in the virtual scene.

Virtual object: It is a movable object in a virtual scene. The movable object may be a virtual character, a virtual animal, a cartoon character, or the like. The virtual object may be a virtual image used for representing the user in the virtual scene. The virtual scene may include a plurality of virtual objects, and each virtual object has a shape and a volume in the virtual scene, and occupies some space in the virtual scene. In certain embodiments, the virtual object may be a role operated and controlled on a client, or may be an artificial intelligence (AI) disposed in a virtual environment battle by training, or may be a non-player character (NPC) disposed in a virtual scene battle. In certain embodiments, the virtual object is a virtual character competing in the virtual scene. In certain embodiments, a quantity of virtual objects in the virtual scene battle may be preset, or may be determined according to quantitative dynamics of clients joining the battle. This is not limited in the embodiments of the present disclosure.

Multiplayer online battle arena (MOBA) game: It is a game in which several forts are provided in a virtual scene, and users on different camps control virtual objects to battle in the virtual scene, to occupy forts or destroy the fort of the opposing camp. For example, the MOBA game may divide the users into at least two opposing camps, and different virtual teams respectively belonging to the at least two opposing camps occupy respective map regions, and compete against each other using specific victory conditions as objectives. Each virtual team includes one or more virtual objects. The victory conditions include, but are not limited to, at least one of occupying forts or destroy forts of the opposing camps, killing virtual objects in the opposing camps, ensure own survivals in a specified scenario and time, seizing a specific resource, and outscoring the opponent within a specified time. The MOBA game may take place in rounds. The same map or different maps may be used in different rounds of each battle arena game. A duration of a round of the MOBA game is from a time point at which the game starts to a time point at which the victory condition is met.

In the related art, due to a limited size of a screen of a mobile phone, a larger number of different types of operation controls cannot be directly displayed in an operation region. In this way, a player may need to manually switch a currently displayed operation control when interacting with different virtual elements. Moreover, a switching step of the operation control is usually complex, so that manually switching the operation control frequently makes it more difficult to operate a game, affecting user experience.

FIG. 1 is a schematic diagram of an implementation environment of an operation control display method based on a virtual scene according to an embodiment of the present disclosure. Referring to FIG. 1, the implementation environment may include: a first terminal 110, a server 140, and a second terminal 160.

An application program supporting display of a virtual scene and a virtual object is installed and run on the first terminal 110. The application program may be any one of a virtual reality application program, a three-dimensional map program, a military simulation program, an RPG, a MOBA game, or a multiplayer gunfight survival game. The first terminal 110 is a terminal used by a first user, and the first user uses the first terminal 110 to operate a first virtual object in the virtual scene to perform a movement. The movement includes, but is not limited to, at least one of body posture adjustment, crawling, walking, running, cycling, jumping, driving, picking-up, shooting, attacking, and throwing. For example, the first virtual object is a first virtual character such as a simulated character role or a cartoon character role.

The first terminal 110 is connected to the server 140 by using a wireless network or a wired network.

The server 140 includes at least one of one server, a plurality of servers, a cloud computing platform, and a virtualization center. The server 140 is configured to provide a backend service for an application program supporting a virtual scene. In certain embodiments, the server 140 takes on primary computing work, and the first terminal 110 and the second terminal 160 take on secondary computing work; alternatively, the server 140 takes on secondary computing work, and the first terminal 110 and the second terminal 160 take on primary computing work; alternatively, collaborative computing is performed by using a distributed computing architecture among the server 140, the first terminal 110, and the second terminal 160.

An application program supporting display of a virtual scene and a virtual object is installed and run on the second terminal 160. The application program may be any one of a virtual reality application program, a three-dimensional map program, a military simulation program, an RPG, a MOBA game, or a multiplayer gunfight survival game. The second terminal 160 is a terminal used by a second user, and the second user uses the second terminal 160 to operate a second virtual object in the virtual scene to perform a movement. The movement includes, but is not limited to, at least one of body posture adjustment, crawling, walking, running, cycling, jumping, driving, picking-up, shooting, attacking, and throwing. For example, the second virtual object is a second virtual character, such as a simulated character role or a cartoon character role.

The second terminal 160 is connected to the server 140 by using a wireless network or a wired network.

In certain embodiments, the first virtual object controlled by the first terminal 110 and the second virtual object controlled by the second terminal 160 are located in the same virtual scene, and in this situation, the first virtual object may interact with the second virtual object in the virtual scene. In some embodiments, the first virtual object and the second virtual object may have a hostile relationship. For example, the first virtual object and the second virtual object may belong to different groups, and different skills may be used to attack each other between the virtual objects having the hostile relationship, thereby interacting with each other in a battle manner, and displaying presentation effects triggered by the skills in the first terminal 110 and the second terminal 160.

In some other embodiments, the first virtual object and the second virtual object may be teammates, for example, the first virtual object and the second virtual object may belong to the same group, have a friend relationship, or have a temporary communication permission.

In certain embodiments, the application programs installed on the first terminal 110 and the second terminal 160 are the same, or the application programs installed on the two terminals are the same type of application programs in different operating system platforms. The first terminal 110 may be generally one of a plurality of terminals, and the second terminal 160 may be generally one of a plurality of terminals. In this embodiment, only the first terminal 110 and the second terminal 160 are used for description. Device types of the first terminal 110 and the second terminal 160 are the same or different. The device types include at least one of a smartphone, a tablet computer, an ebook reader, a Moving Picture Experts Group Audio Layer III (MP3) player, a Moving Picture Experts Group Audio Layer IV (MP4) player, a laptop, and a desktop computer. For example, the first terminal 110 and the second terminal 160 may be smartphones, or other handheld portable game devices. The following embodiment is described by using an example in which the terminal includes a smartphone.

A person skilled in the art may learn that there may be more or fewer terminals. For example, there may be only one terminal, or there may be dozens of or hundreds of terminals or more. The quantity and the device type of the terminals are not limited in the embodiments of the present disclosure.

The operation control display method based on a virtual scene provided in this embodiment of the present disclosure may be applied to various types of appliance programs, to simplify user operation by automatically adjusting an operation control displayed in an operation interface. In this embodiment of the present disclosure, the method being applied to a MOBA game is used as an example, in which a user may operate, by using a terminal, a target virtual object to perform a movement in a virtual scene, or interact with virtual elements in the virtual scene. In some embodiments, the terminal automatically adjusts a currently displayed virtual control based on changes of the virtual elements interacting with the target virtual object, so that the user does not need to switch the virtual control manually, thereby reducing operation difficulty.

Figure 2:
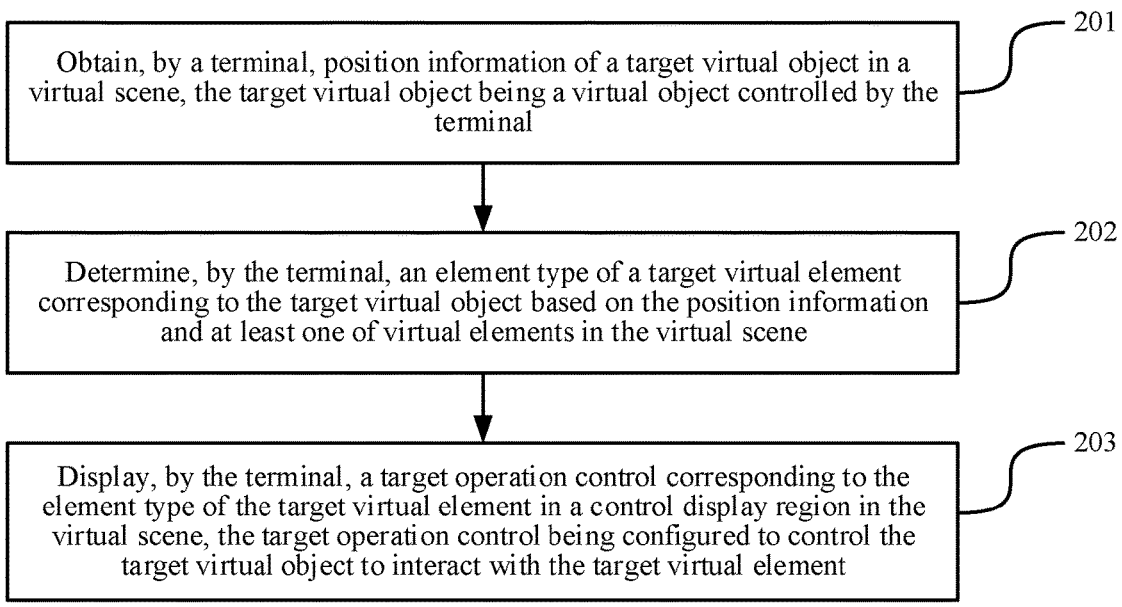
FIG. 2 is a schematic flowchart of an operation control display method based on a virtual scene according to one or more embodiments of the present disclosure.

FIG. 2 is a flowchart of an operation control display method based on a virtual scene according to an embodiment of the present disclosure. The method may be applied to a computing device, and in some embodiments, the computing device is any terminal in the implementation environment. In one or more embodiments of the present disclosure, the term "computing device" is employed herein interchangeably with the term "computer device." In this embodiment of the present disclosure, the terminal being an execution entity is used as an example, and the operation control display method based on a virtual scene is introduced with reference to FIG. 2:

201: Obtain, by a terminal, position information of a target virtual object in a virtual scene, the target virtual object being a virtual object controlled by the terminal.

In certain embodiments, the target virtual object is a virtual object controlled by a user using the terminal.

Figure 3:
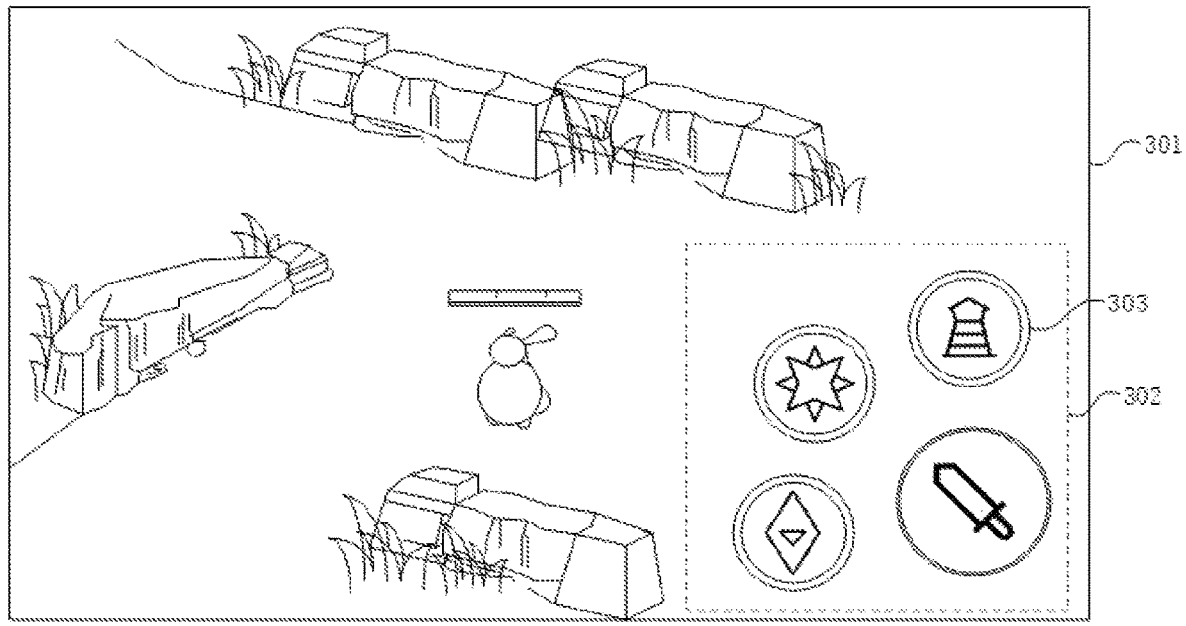
FIG. 3 is a schematic diagram of an operation interface according to one or more embodiments of the present disclosure.

In certain embodiments, after detecting that the user enters a round of game, the terminal can display a virtual scene corresponding to the round of game, and the virtual scene may include various types of virtual elements. The virtual elements may include virtual objects, virtual buildings, virtual items, and the like, and each virtual element has a shape and a volume in the virtual scene, and occupies some space in the virtual scene. For example, the virtual elements may be a defensive tower, a minion, a monster, a fruit, and the like in the virtual scene. Specific types and quantities of the virtual elements are not limited in the embodiments of the present disclosure. The terminal may further display at least one operation control in a control display region in the virtual scene, and the at least one operation control may be used to control the target virtual object to interact with each type of virtual elements. For example, the operation controls include a minion key used for attacking a minion, a tower key used for attacking a defensive tower, a monster key used for attacking a monster in a jungle, and a fruit key used for attacking a fruit in the virtual scene. In some embodiments, the fruit includes a bomb fruit and a recovery fruit, and the bomb fruit has an influence range. When the target virtual object is in the influence range and attacks the bomb fruit, the bomb fruit may explode, and "blow off" the target virtual object to a position opposite to the bomb fruit. When the player controls the target virtual object to attack the recovery fruit, the recovery fruit may be hashed to a plurality of sub-recovery fruits, and the target virtual object may recover a specific health value when being in contact with the sub-recovery fruits. In some embodiments, the health value is also referred to as a hit point. FIG. 3 is a schematic diagram of an operation interface according to an embodiment of the present disclosure. The operation interface includes a virtual scene display region 301 and an operation control display region 302, and the operation control display region 302 displays a plurality of operation controls 303.

In certain embodiments, the user may control, through an operation such as a drag operation for the target virtual object, the target virtual object to perform a movement in the virtual scene, and the terminal may obtain the position information of the target virtual object in the virtual scene in real time. In some embodiments, the terminal may represent the position information by coordinates. The specific method for the terminal to obtain the position information is not limited in the embodiments of the present disclosure.

202: Determine, by the terminal, an element type of a target virtual element corresponding to the target virtual object based on the position information and at least one of virtual elements in the virtual scene.

In certain embodiments, the terminal may determine, based on the position information of the target virtual object, virtual elements included in a current virtual scene, or the position information and the virtual elements included in the current virtual scene, a virtual element with which the target virtual object interacts. That is, the terminal determines the target virtual element corresponding to the target virtual object, and the target virtual element is an interactive element that may interact with the target virtual object. In some embodiments, the target virtual element is also referred to as an interactable element. In some embodiments, the terminal may determine the element type of the target virtual element. For example, when the target virtual object is located in a jungle and virtual elements included in the jungle are monsters, the target virtual element corresponding to the target virtual object is a monster. In some embodiments, the monster is also referred to as a wild monster; and when the target virtual object is located in another region than the jungle, and virtual elements appearing in the another region include a minion, rather than a monster, the target virtual element corresponding to the target virtual object is the minion. The description for the method for determining the target virtual element is only an exemplary description, and the specific method for determining the target virtual element is not limited in the embodiments of the present disclosure.

203: Display, by the terminal, a target operation control corresponding to the element type of the target virtual element in a control display region in the virtual scene, the target operation control being configured to control the target virtual object to interact with the target virtual element.

In certain embodiments, the control display region is a region used for displaying an operation control, and in some embodiments, the control display region displays one or more operation controls.

In this embodiment of the present disclosure, interaction between the target virtual object and different types of virtual elements may be implemented by using different operation controls. For example, when the target virtual object is controlled to attack a monster, a used operation control is a monster key; when the target virtual object is controlled to attack a minion, a used operation control is a minion key; and when the target virtual object is controlled to attack a defensive tower, a used operation control is a tower key.

In certain embodiments, the terminal may automatically adjust an operation control displayed in an operation interface based on an element type of a target virtual element currently facing the target virtual object. For example, when the target virtual object is located in a jungle and the terminal determines that the target virtual element corresponding to the target virtual object is a monster, a monster key is displayed in an operation control display region of the operation interface; and when the target virtual object leaves the jungle and the terminal determines that the target virtual element corresponding to the target virtual object is a minion, the monster key displayed in the operation control display region of the operation interface is switched to a minion key.

According to the technical solution provided in the embodiments of the present disclosure, position information of a target virtual object in a virtual scene is obtained. Because different types of virtual elements appear in different regions of the virtual scene, a target virtual element corresponding to the target virtual object at a current position may be determined based on the position information and at least one of virtual elements in the virtual scene. Because different operation controls may be needed when the target virtual object interacts with different types of virtual elements, the terminal may switch an operation control displayed in a control display region in the virtual scene to a target operation control corresponding to an element type of the target virtual element. In this way, a user does not need to manually switch the operation control when operating the target virtual object to interact with the target virtual element, which can effectively reduce operation complexity, and improve user experience.

Figure 4:
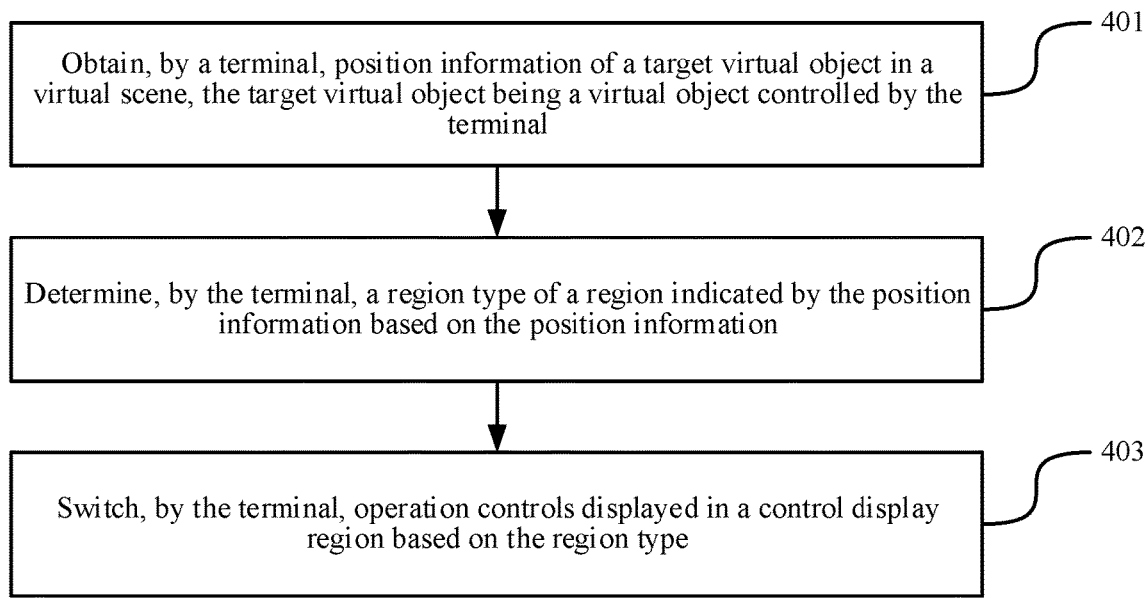
FIG. 4 is a schematic flowchart of an operation control display method based on a virtual scene according to one or more embodiments of the present disclosure.

The embodiment is a brief description of the operation control display method based on a virtual scene, and the method is described in detail below with reference to FIG. 4. FIG. 4 is a flowchart of an operation control display method based on a virtual scene according to an embodiment of the present disclosure. In certain embodiments, different virtual elements appear in different regions of a virtual scene, that is, when a target virtual object is located in different regions, corresponding target virtual elements are also different. Therefore, the terminal may switch an operation control displayed in a control display region based on a position of the target virtual object. Referring to FIG. 4, this embodiment includes the following steps:

401: Obtain, by a terminal, position information of a target virtual object in a virtual scene, the target virtual object being a virtual object controlled by the terminal.

After detecting that the user enters a round of game, the terminal may display a virtual scene corresponding to the round of game, and at least one virtual object and other virtual elements are displayed in the virtual scene. In certain embodiments, after the round of game is started, the terminal may obtain the position information of the target virtual object currently controlled by the user in real time. In certain embodiments, the terminal may alternatively obtain the position information of the target virtual object when detecting an operation such as a drag operation performed by the user on the target virtual object, that is, when the user controls the target virtual object to be in a moving state. In some embodiments, the drag operation performed by the user on the target virtual object is implemented by the user operating a virtual joystick in the operation interface. The specific method for obtaining the position information is not limited in the embodiments of the present disclosure.

In certain embodiments, when the virtual scene is a three-dimensional scene, the position information may be represented in a form of position coordinates (x, y, z), where (x, z) may be used for determining a position of the target virtual object in a plane direction, and y may be used for determining a position of the target virtual object in a vertical direction. The position information may alternatively be represented in other forms, and this is not limited in the embodiments of the present disclosure.

402: Determine, by the terminal, a region type of a region indicated by the position information based on the position information.

In certain embodiments, the developer may divide a map of the virtual scene into M*N grids, that is, the map is divided into M*N regions, M and N being positive integers. In some embodiments, values of M and N respectively correspond to a length and a width of the map. When or in response to determining that a resolution of the map is M*N, each pixel in the map is used as a region. M*N may alternatively be set to other values, and this is not limited in the embodiments of the present disclosure. Different position information may indicate different regions, and one region corresponds to one region type. For example, the region type may be a jungle, a non-jungle, or the like, and a correspondence between the region and the region type is set by the developer.

In certain embodiments, a configuration file of an appliance program includes a map index table, and the map index table is used for storing a position index and a region type corresponding to each region. The appliance program is an appliance program of the virtual scene. In some embodiments, position information of the region in the plane direction may be used as the position index. For example, for a vertex of a grid region, position coordinates (x, z) of the vertex in the plane direction may be used as a position index of the grid region. Because each pixel is used as a region when the map is divided into a plurality of grid regions, two values in a position index corresponding to each grid region are both integers. The description of the method for determining the position index is only an exemplary description, and the specific method for determining the position index is not limited in the embodiments of the present disclosure.

In certain embodiments, the terminal may determine, based on the position information, a position index of the region indicated by the position information. For example, the terminal may obtain position coordinates in the plane direction in the position information, that is, a value of an x-axis and a value of a z-axis, and (x', z') is obtained as the position index by rounding the two values. The terminal then obtains, based on the position index, the region type of the region from the map index table corresponding to the virtual scene, that is, the region type corresponding to the position index is used as the region type of the region. The description of the method for determining the region type is only an exemplary description, and the specific method for determining the region type is not limited in the embodiments of the present disclosure.

403: Switch, by the terminal, an operation control displayed in a control display region based on the region type.

In this embodiment of the present disclosure, different regions include different types of virtual elements, so that when the target virtual object is located in different regions, corresponding target virtual elements are also different. For example, when or in response to determining that the region type is a jungle and a virtual element included in the jungle is a monster rather than a minion, the corresponding target virtual element is a monster when the target virtual object enters the jungle, and the corresponding target virtual element is a minion when the target virtual object leaves the jungle. In this embodiment of the present disclosure, because different region types may determine that the target virtual elements corresponding to the target virtual object are different, the terminal may switch the operation control based on the region type, that is, an element type of a virtual element corresponding to the region type is determined as the element type of the target virtual element. The terminal switches the operation control displayed in the control display region to the target operation control corresponding to the element type of the target virtual element. In certain embodiments, each time the terminal obtains the position information of the target virtual object, the operation control displayed in the control display region may be updated. In certain embodiments, each time the terminal obtains the position information of the target virtual object, the terminal may compare the region type corresponding to the position information with a region type corresponding to position information obtained last time, determine whether the region type changes, and then perform the step of updating the operation control in response to the change of the region type. The specific method for updating the operation control is not limited in the embodiments of the present disclosure.

Figure 5:
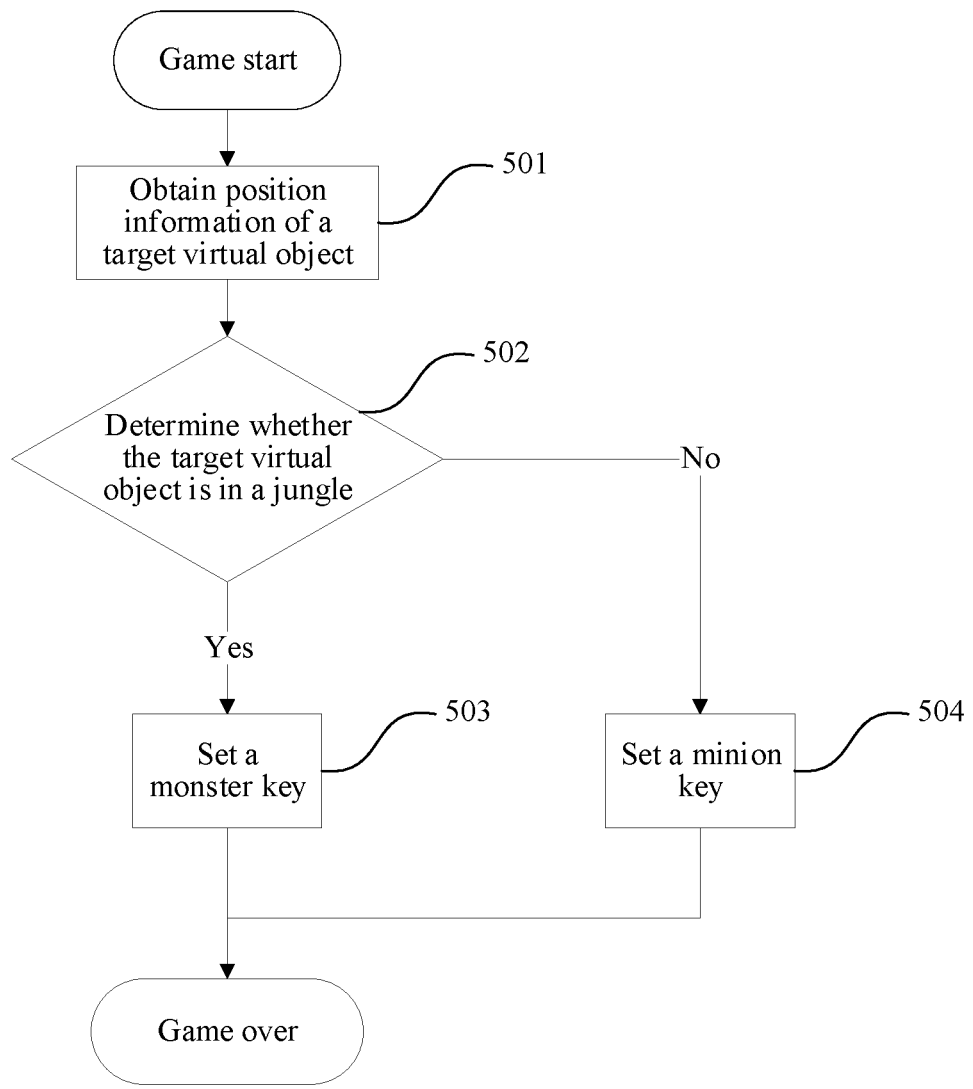
FIG. 5 is a schematic diagram of a switching process of operation controls according to one or more embodiments of the present disclosure.
Figure 6:
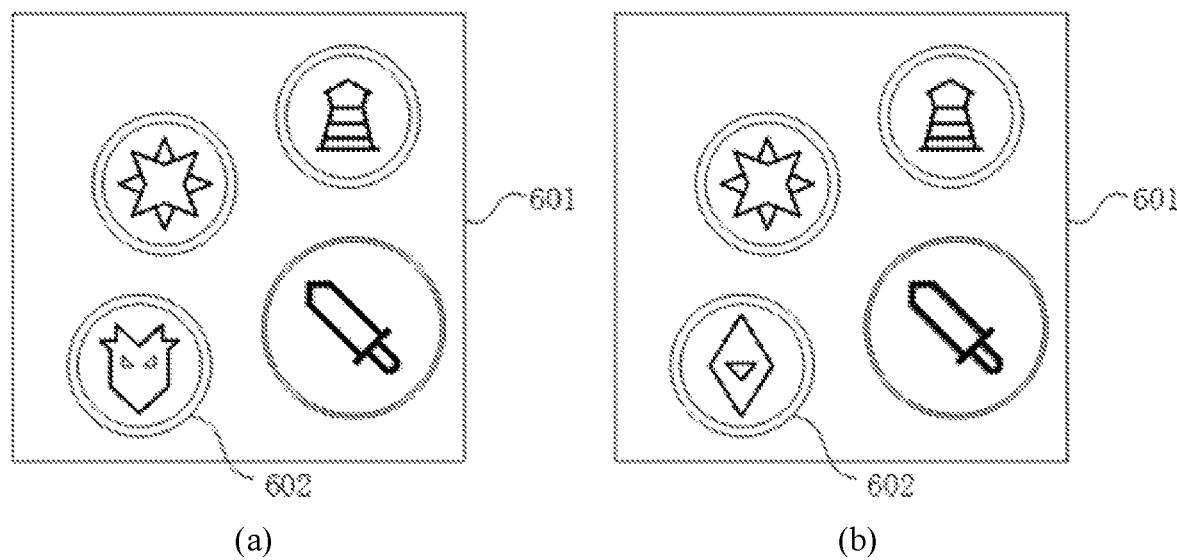
FIG. 6 is a schematic diagram of a control display region according to one or more embodiments of the present disclosure.

Referring to FIG. 5 and FIG. 6, the switching process of the operation control is described below by using a switching process of a minion key and a monster key as an example. FIG. 5 is a schematic diagram of a switching process of operation controls according to an embodiment of the present disclosure. Referring to FIG. 5, in response to a start of a game, the terminal may perform step 501 of obtaining position information of a target virtual object, perform, based on the position information, step 502 of determining whether the target virtual object is in a jungle, perform step 503 of setting a monster key when or in response to determining that the target virtual object is in the jungle, and perform step 504 of setting a minion key when or in response to determining that the target virtual object is not in the jungle.

FIG. 6 is a schematic diagram of a control display region according to an embodiment of the present disclosure. Referring to FIG. 6, a region 602 in a control display region 601 is a display region of a minion key and a monster key. In some embodiments, when the target virtual object enters a jungle, the region 602 displays an icon of the monster key as shown in figure (a) of FIG. 6; and in some embodiments, when the target virtual object leaves the jungle, the region 602 displays an icon of the minion key as shown in FIG. (b) of FIG. 6.

In certain embodiments, different regions include various types of virtual elements. For example, a specific region includes A-type virtual elements, B-type virtual elements, and C-type virtual elements, and the user may control, by using three different operation controls, the target virtual object to interact respectively with the three types of virtual elements. In some embodiments, the three operation controls have the same display position in the control display region, that is, the position corresponds to three candidate operation controls. When the terminal determines that the target virtual object is located in the specific region, the three operation controls may be preloaded, and in this situation, the three operation controls may also be referred to as the candidate operation controls, that is, the terminal loads the candidate operation controls. In a moving process of the target virtual object, when a position of the target virtual object meets a display condition of any operation control, an icon of the any operation control is displayed. In certain embodiments, the display condition is set by the developer, for example, the display condition is set to: a distance between the target virtual object and a virtual element being less than a distance threshold, or the like, and this is not limited in the embodiments of the present disclosure. By applying the solution, the terminal preloads the operation controls based on the position information of the target virtual object, which can improve the efficiency of switching the operation controls.

According to the technical solution provided in the embodiments of the present disclosure, position information of a target virtual object in a virtual scene is obtained. Because different types of virtual elements appear in different regions of the virtual scene, a target virtual element corresponding to the target virtual object at a current position may be determined based on the position information and at least one of virtual elements in the virtual scene. Because different operation controls may be needed when the target virtual object interacts with different types of virtual elements, the terminal may switch an operation control displayed in a control display region in the virtual scene to a target operation control corresponding to an element type of the target virtual element. In this way, a user does not need to manually switch the operation control when operating the target virtual object to interact with the target virtual element, which can effectively reduce operation complexity, and improve user experience.

Figure 7:
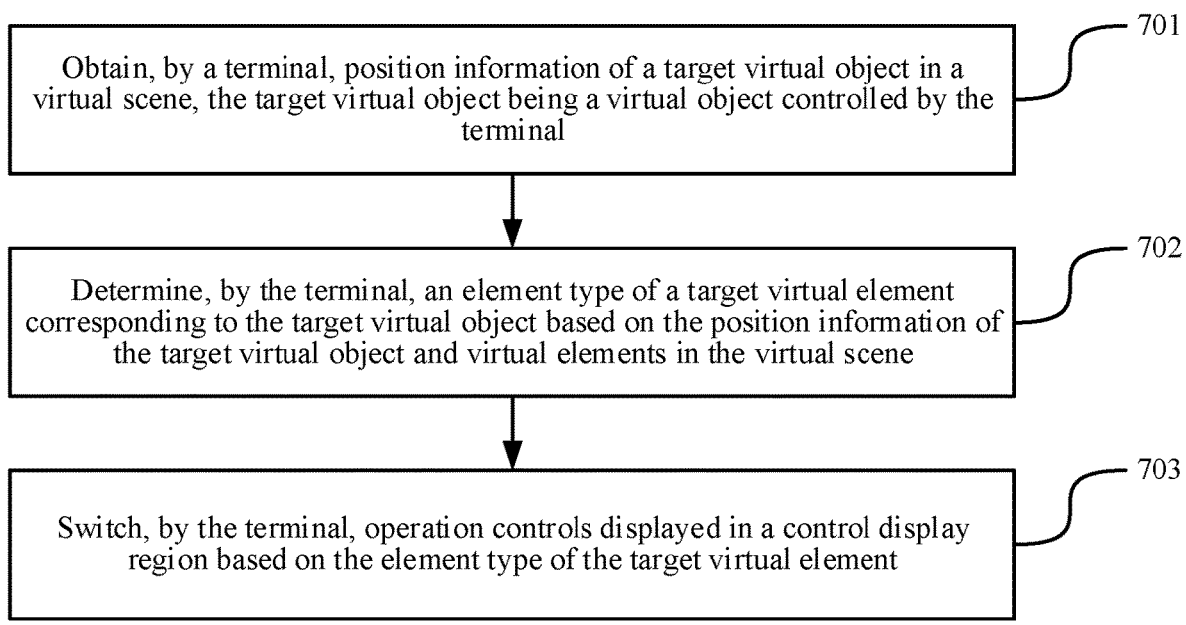
FIG. 7 is a schematic flowchart of an operation control display method based on a virtual scene according to one or more embodiments of the present disclosure.

In certain embodiments, the terminal may further comprehensively determine a target virtual element currently corresponding to the target virtual object based on the position information of the target virtual object and virtual elements in the virtual scene, to switch the operation control based on an element type of the current target virtual element. FIG. 7 is a flowchart of an operation control display method based on a virtual scene according to an embodiment of the present disclosure. Referring to FIG. 7, this embodiment may include the following steps:

701: Obtain, by a terminal, position information of a target virtual object in a virtual scene, the target virtual object being a virtual object controlled by the terminal.

A process for the terminal to obtain the position information is similar to the step 401, and the details are not described herein again.

702: Determine, by the terminal, an element type of a target virtual element corresponding to the target virtual object based on the position information of the target virtual object and virtual elements in the virtual scene.

In certain embodiments, the process includes any one of the following various implementations:

Implementation 1: the terminal determines, based on the position information, an element type of a virtual element closest to the target virtual object from the virtual elements included in the virtual scene as the element type of the target virtual element. That is, the terminal obtains position information of virtual elements that can interact with the target virtual object in the virtual scene, determines distances between the virtual elements that can interact with the target virtual object and the target virtual object, and uses a virtual element closest to the target virtual object as the target virtual element. For example, when the virtual element closest to the target virtual object is a defensive tower, the terminal uses the defensive tower as the target virtual element.

Implementation 2: the terminal determines, by using a position indicated by the position information as a center, a target region in the virtual scene. The terminal determines a quantity of virtual elements included in each element type in the target region. The terminal determines an element type including a maximum quantity of virtual elements as the element type of the target virtual element. In some embodiments, the target region is an effective interaction region, that is, the target virtual object can interact with virtual elements located in the target region, and cannot interact with virtual elements located outside the target region. In certain embodiments, a radius of the target region is set by the developer, and this is not limited in the embodiments of the present disclosure. For example, when a virtual element with a maximum quantity in the target region is a fruit, the terminal may determine the fruit as the target virtual element.

Implementation 3: the terminal determines, by using a position indicated by the position information as a center, a target region in the virtual scene. The terminal determines an interactive priority of each virtual element in the target region. The terminal determines an element type of a virtual element having a highest interactive priority as the element type of the target virtual element. In some embodiments, the interactive priority is used for indicating an order of interaction between the target virtual object and various types of virtual elements. In certain embodiments, the interactive priority is set by the developer, that is, set to a default value, or set by a user. This is not limited in the embodiments of the present disclosure. For example, when the target region includes both a defensive tower and a fruit, and an interactive priority of the fruit is higher than that of the defensive tower, the terminal may determine the fruit as the target virtual element.

In a MOBA game, there are various types of virtual elements. When the solution is applied, based on a position of a target virtual object controlled by a user and element types of virtual elements close to the position, a target virtual element is automatically determined for the user, and the step of switching an operation control based on an element type of the target virtual element is performed, which can simplify operation steps of the user, and reduce operation difficulty of the game.

In the embodiments of the present disclosure, the methods may alternatively be combined. For example, different weights may be assigned to distances between virtual elements and the target virtual object and interactive priorities corresponding to the virtual elements, total weights corresponding to the virtual elements are determined according to the distances between the virtual elements and the target virtual object and the interactive priorities corresponding to the virtual elements, and a virtual element having a greatest total weight is determined as the target virtual element. The description of determining the target virtual element based on a combination condition is only an exemplary description of a conditional combination manner, processes of determining the target virtual element based on other combination conditions are similar to the process, and the details are not repeated herein.

The description of the method for determining the element type of the target virtual element is only an exemplary description, and the method for determining the element type of the target virtual element is not limited in the embodiments of the present disclosure.

703: Switch, by the terminal, an operation control displayed in a control display region based on the element type of the target virtual element.

In this embodiment of the present disclosure, the terminal may switch the operation control displayed in the control display region in the virtual scene to a target operation control corresponding to the element type of the target virtual element, the target operation control being configured to control the target virtual object to interact with the target virtual element. In some embodiments, for any control display position in the control display region, candidate operation controls corresponding to the any control display position are obtained. For example, when or in response to determining that a display position of a minion key is the same as a display position of a monster key in a virtual scene, that is, the minion key and the monster key are both displayed at the any control display position in the control display region, the candidate operation controls corresponding to the any control display position are the minion key and the monster key. The terminal may match the element type of the target virtual element with a display condition of each candidate operation control. The terminal determines a candidate operation control of which a display condition successfully matches the element type of the target virtual element as the target operation control. The terminal displays the target operation control at the any control display position. In some embodiments, the terminal may determine whether an operation control currently displayed at the control display position is the same as the target operation control; display or continuously display the currently displayed operation control when or in response to determining that the operation control currently displayed at the control display position is the same as the target operation control; and switch the currently displayed operation control to the target operation control when or in response to determining that the operation control currently displayed at the control display position is different from the target operation control. In certain embodiments, the display condition is set by the developer. For example, a display condition of a tower key is set to: a current target virtual element being a defensive tower, and a display condition of a fruit key is set to: a current target virtual element being a fruit.

Figure 8:
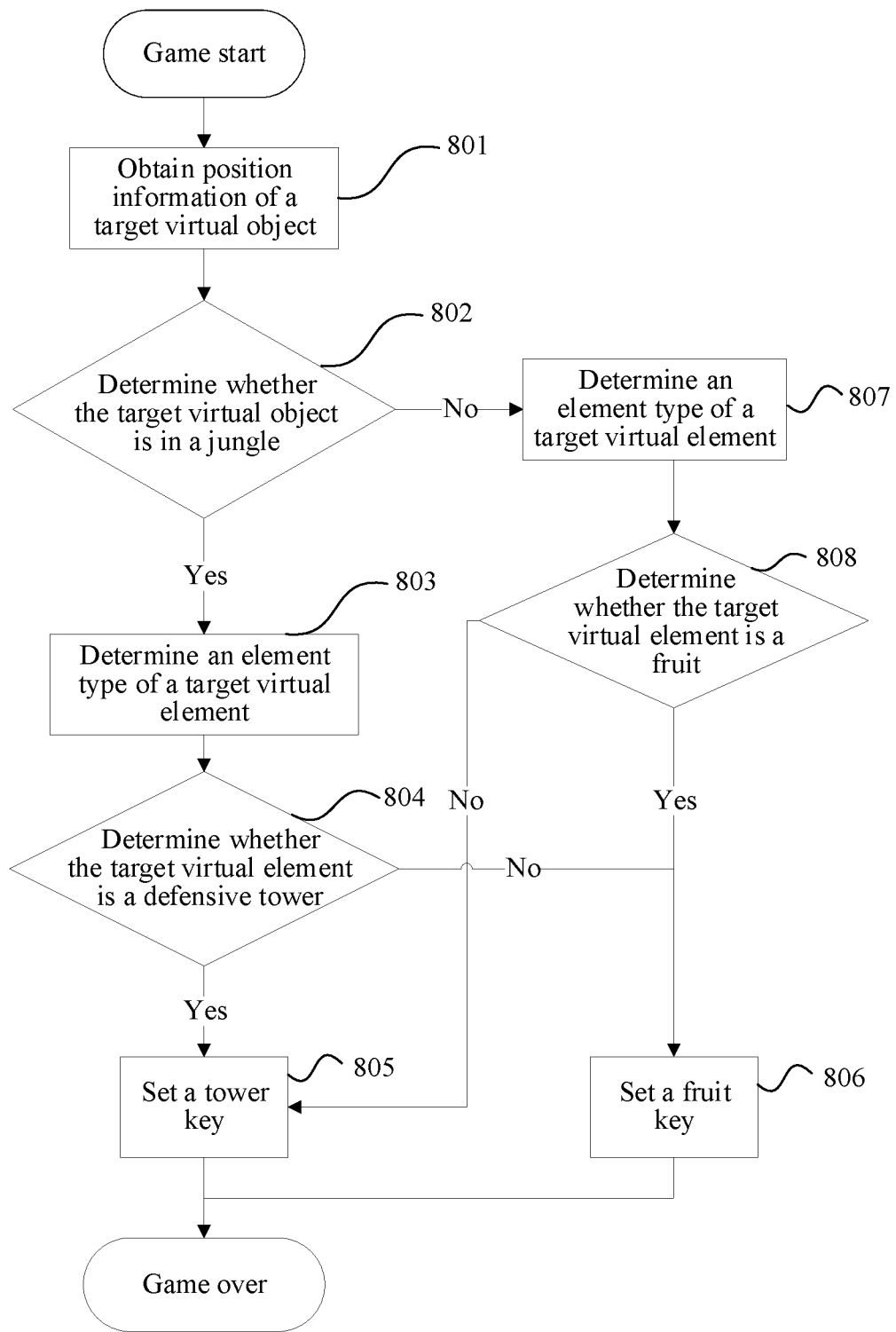
FIG. 8 is a schematic diagram of a switching process of operation controls according to one or more embodiments of the present disclosure.
Figure 9:
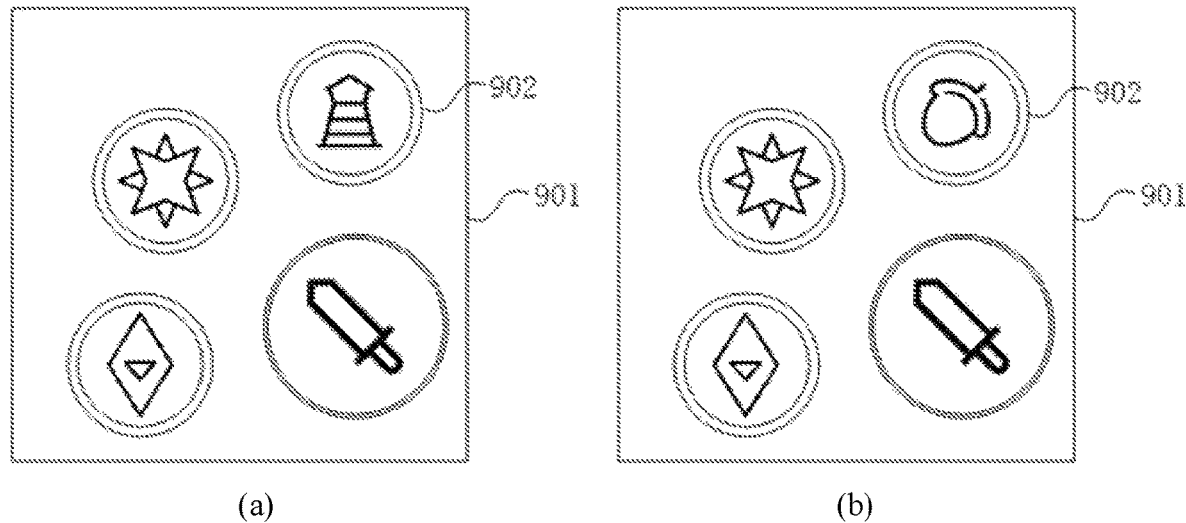
FIG. 9 is a schematic diagram of a control display region according to one or more embodiments of the present disclosure.

Referring to FIG. 8 and FIG. 9, a switching process of the tower key and the fruit key is used as an example for description. FIG. 8 is a schematic diagram of a switching process of operation controls according to an embodiment of the present disclosure. Referring to FIG. 8, in response to a start of a game, the terminal may perform step 801 of obtaining position information of a target virtual object; perform, based on the position information, step 802 of determining whether the target virtual object is in a jungle; perform, when or in response to determining that the target virtual object is in the jungle, step 803 of determining an element type of a target virtual element; perform, based on the target virtual element, step 804 of determining whether the target virtual element is a defensive tower; perform step 805 of setting a tower key when or in response to determining that the target virtual element is a defensive tower; and perform step 806 of setting a fruit key when or in response to determining that the target virtual element is not a defensive tower. The terminal may perform, when or in response to determining that the target virtual object is not in the jungle, step 807 of determining an element type of a target virtual element, perform, based on the target virtual element, step 808 of determining whether the target virtual element is a fruit, perform step 806 of setting the fruit key when or in response to determining that the target virtual element is a fruit, and perform step 805 of setting the tower key when or in response to determining that the target virtual element is not a fruit. That is, whether the target virtual object is in the jungle or not, the terminal may need to determine the target virtual element corresponding to the target virtual object, and determine, based on the element type of the target virtual element, an operation control to display. FIG. 9 is a schematic diagram of a control display region according to an embodiment of the present disclosure. Referring to FIG. 9, a region 902 in a control display region 901 is a display region of a tower key and a fruit key. When the target virtual element corresponding to the target virtual object is a defensive tower, the region 902 may display an icon of the tower key as shown in figure (a) of FIG. 9; and when the target virtual element corresponding to the target virtual object is a fruit, the region 902 may display an icon of the fruit key as shown in FIG. (b) of FIG. 9.

According to the technical solution provided in the embodiments of the present disclosure, position information of a target virtual object is obtained. Because different regions correspond to different virtual elements in a virtual scene, an element type corresponding to a target virtual element may be determined based on a position of the target virtual object. Further, based on position information of the target virtual object, an operation control displayed in an operation interface may be automatically switched, and an operation control matching a region in which the target virtual object is located is displayed in the operation interface, that is, an operation control matching the target virtual element corresponding to the target virtual object is displayed in the operation interface. By applying the solution, in one aspect, a user does not need to switch manually the operation control during the operation, which can effectively reduce operation complexity, and improve user experience. In another aspect, there is no need to display all operation controls in an operation interface, and only an operation control related to a current target virtual element is displayed, which resolves a problem that a large number of operation controls cannot be arranged due to a limited size of a terminal screen.

All the optional technical solutions may be arbitrarily combined to form an optional embodiment of the present disclosure, and details are not described herein again.

Figure 10:
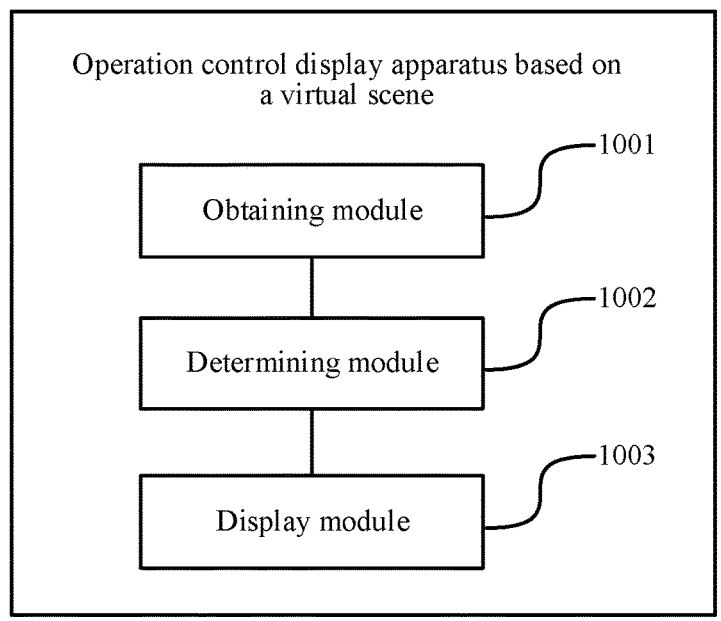
FIG. 10 is a schematic structural diagram of an operation control display apparatus based on a virtual scene according to one or more embodiments of the present disclosure.

FIG. 10 is a schematic structural diagram of an operation control display apparatus based on a virtual scene according to an embodiment of the present disclosure. Referring to FIG. 10, the apparatus includes an obtaining module 1001, a determining module 1002, and a display module 1003.

The obtaining module 1001 is configured to obtain position information of a target virtual object in a virtual scene, the target virtual object being a virtual object controlled by a terminal.

The determining module 1002 is configured to determine, based on the position information and at least one of virtual elements in the virtual scene, an element type of a target virtual element corresponding to the target virtual object.

The display module 1003 is configured to display, in a control display region in the virtual scene, a target operation control corresponding to the element type of the target virtual element, the target operation control being configured to control the target virtual object to interact with the target virtual element.

In certain embodiments, the determining module 1002 is configured to: determine, based on the position information, a position index of a region indicated by the position information; obtain, based on the position index, a region type of the region from a map index table corresponding to the virtual scene, the map index table including a position index of each region in the virtual scene and a region type of the each region; and determine an element type of a virtual element corresponding to the region type as the element type of the target virtual element.

In certain embodiments, the determining module 1002 is configured to: determine, based on the position information, an element type of a virtual element closest to the target virtual object from the virtual elements included in the virtual scene as the element type of the target virtual element.

In certain embodiments, the determining module 1002 is configured to: determine, by using a position indicated by the position information as a center, a target region in the virtual scene; determine a quantity of virtual elements included in each element type in the target region; and determine an element type including a maximum quantity of virtual elements as the element type of the target virtual element.

In certain embodiments, the determining module 1002 is configured to: determine, by using a position indicated by the position information as a center, a target region in the virtual scene; determine an interactive priority of each virtual element in the target region; and determine an element type of a virtual element having a highest interactive priority as the element type of the target virtual element.

In certain embodiments, the display module 1003 is configured to: obtain, for any control display position in the control display region, candidate operation controls corresponding to the any control display position; match the element type of the target virtual element with a display condition of each candidate operation control; determine a candidate operation control of which a display condition successfully matches the element type of the target virtual element as the target operation control; and display the target operation control at the any control display position.

In certain embodiments, the display module 1003 is configured to: determine whether an operation control currently displayed at the control display position is the same as the target operation control; display or continuously display the currently displayed operation control when or in response to determining that the operation control currently displayed at the control display position is the same as the target operation control; and switch the currently displayed operation control to the target operation control when or in response to determining that the operation control currently displayed at the control display position is different from the target operation control.

In certain embodiments, the obtaining module 1001 is configured to: obtain the position information of the target virtual object in real time in response to a movement operation on the target virtual object.

In certain embodiments, the obtaining module 1001 is configured to: determine a region type of a region indicated by the position information; and perform, in response to a change of the region type, the step of determining, based on the position information and at least one of virtual elements in the virtual scene, an element type of a target virtual element corresponding to the target virtual object.

According to the apparatus provided in the embodiments of the present disclosure, position information of a target virtual object in a virtual scene is obtained. Because different types of virtual elements appear in different regions of the virtual scene, a target virtual element corresponding to the target virtual object at a current position may be determined based on the position information and at least one of virtual elements in the virtual scene. Because different operation controls may be needed when the target virtual object interacts with different types of virtual elements, the terminal may switch an operation control displayed in a control display region in the virtual scene to a target operation control corresponding to an element type of the target virtual element. In this way, a user does not need to manually switch the operation controls when operating the target virtual object to interact with the target virtual element, which can effectively reduce operation complexity, and improve user experience.

The division of the above functional modules is only described for exemplary purposes when the operation control display apparatus based on a virtual scene provided in the embodiment displays an operation control. In actual implementation, the functions may be allocated to different functional modules according to specific may need, which means that the internal structure of the apparatus is divided into different functional modules to perform all or some of the functions described above. In addition, the operation control display apparatus based on a virtual scene provided in the embodiments belongs to the same concept as the operation control display method based on a virtual scene in the embodiments. For a specific implementation process of the apparatus, reference may be made to the method embodiment, and the details are not described herein again.

A computing device provided in the technical solutions may be implemented as a terminal or a server. For example, the computing device includes one or more processors and one or more memories, the one or more memories storing at least one program code, the at least one program code being loaded and executed by the one or more processors, to implement the following operations: obtaining position information of a target virtual object in a virtual scene, the target virtual object being a virtual object controlled by a terminal; determining, based on the position information and at least one of virtual elements in the virtual scene, an element type of a target virtual element corresponding to the target virtual object; and displaying, in a control display region in the virtual scene, a target operation control corresponding to the element type of the target virtual element, the target operation control being configured to control the target virtual object to interact with the target virtual element.

In certain embodiments, the at least one program code is loaded and executed by the one or more processors, to implement the following operations: determining, based on the position information, a position index of a region indicated by the position information; obtaining, based on the position index, a region type of the region from a map index table corresponding to the virtual scene, the map index table including a position index of each region in the virtual scene and a region type of the each region; and determining an element type of a virtual element corresponding to the region type as the element type of the target virtual element.

In certain embodiments, the at least one program code is loaded and executed by the one or more processors, to implement the following operation: determining, based on the position information, an element type of a virtual element closest to the target virtual object from the virtual elements included in the virtual scene as the element type of the target virtual element.

In certain embodiments, the at least one program code is loaded and executed by the one or more processors, to implement the following operations: determining, by using a position indicated by the position information as a center, a target region in the virtual scene; determining a quantity of virtual elements included in each element type in the target region; and determining an element type including a maximum quantity of virtual elements as the element type of the target virtual element.

In certain embodiments, the at least one program code is loaded and executed by the one or more processors, to implement the following operations: determining, by using a position indicated by the position information as a center, a target region in the virtual scene; determining an interactive priority of each virtual element in the target region; and determining an element type of a virtual element having a highest interactive priority as the element type of the target virtual element.

In certain embodiments, the at least one program code is loaded and executed by the one or more processors, to implement the following operations: obtaining, for any control display position in the control display region, candidate operation controls corresponding to the any control display position; matching the element type of the target virtual element with a display condition of each candidate operation control; determining a candidate operation control of which a display condition successfully matches the element type of the target virtual element as the target operation control; and displaying the target operation control at the any control display position.

In certain embodiments, the at least one program code is loaded and executed by the one or more processors, to implement the following operations: determining whether an operation control currently displayed at the control display position is the same as the target operation control; and displaying or continuously displaying the currently displayed operation control when or in response to determining that the operation control currently displayed at the control display position is the same as the target operation control; and switching the currently displayed operation control to the target operation control when or in response to determining that the operation control currently displayed at the control display position is different from the target operation control.

In certain embodiments, the at least one program code is loaded and executed by the one or more processors, to implement the following operation: obtaining the position information of the target virtual object in real time in response to a movement operation on the target virtual object.

In certain embodiments, the at least one program code is loaded and executed by the one or more processors, to implement the following operations: determining a region type of a region indicated by the position information; and performing, in response to a change of the region type, the step of determining, based on the position information and at least one of virtual elements in the virtual scene, an element type of a target virtual element corresponding to the target virtual object.

Figure 11:
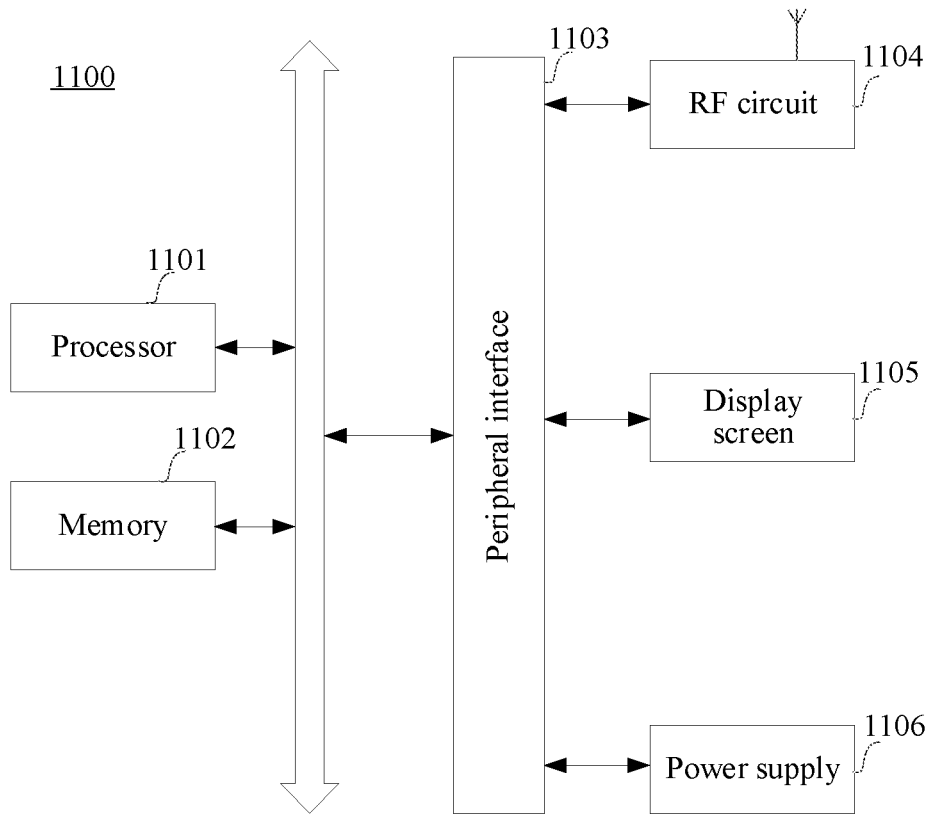
FIG. 11 is a schematic structural diagram of a terminal according to one or more embodiments of the present disclosure.

The computing device being a terminal is used as an example for description below. FIG. 11 is a schematic structural diagram of a terminal according to an embodiment of the present disclosure. Generally, the terminal 1100 includes one or more processors 1101 and one or more memories 1102.

The processor 1101 may include one or more processing cores. For example, the processor may be a 4-core processor or an 8-core processor. The processor 1101 may be implemented in at least one hardware form of digital signal processor (DSP), a field-programmable gate array (FPGA), and a programmable logic array (PLA).

The memory 1102 may include one or more computer-readable storage media. The computer-readable storage medium may be non-transient. The memory 1102 may further include a high-speed random access memory and a nonvolatile memory, for example, one or more disk storage devices or flash storage devices. In some embodiments, a non-transitory computer-readable storage medium in the memory 1102 is configured to store at least one program code, the at least one program code being configured to be executed by the processor 1101 to implement the operation control display method based on a virtual scene provided in the method embodiments of the present disclosure.

In some embodiments, the terminal 1100 may include a peripheral interface 1103 and at least one peripheral. The processor 1101, the memory 1102, and the peripheral interface 1103 may be connected by a bus or a signal line. Each peripheral may be connected to the peripheral interface 1103 by using a bus, a signal cable, or a circuit board. The peripheral includes: at least one of a radio frequency (RF) circuit 1104, a display screen 1105, and a power supply 1106.

The peripheral interface 1103 may be configured to connect the at least one peripheral related to input/output (I/O) to the processor 1101 and the memory 1102.

The RF circuit 1104 is configured to receive and transmit an RF signal, also referred to as an electromagnetic signal. The RF circuit 1104 communicates with a communication network and other communication devices through the electromagnetic signal. The RF circuit 1104 converts an electric signal into an electromagnetic signal for transmission, or converts a received electromagnetic signal into an electric signal.

The display screen 1105 is configured to display a user interface (UI). The UI may include a graph, a text, an icon, a video, and any combination thereof. When the display screen 1105 is a touch display screen, the display screen 1105 is further capable of collecting touch signals on or above a surface of the display screen 1105. The touch signal may be used as a control signal to be inputted to the processor 1101 for processing. In this situation, the display screen 1105 may be further configured to provide a virtual button and/or a virtual keyboard that are/is also referred to as a soft button and/or a soft keyboard. The display screen 1105 may be prepared by using materials such as a liquid crystal display (LCD), an organic light-emitting diode (OLED), or the like.

The power supply 1106 is configured to supply power to components in the terminal 1100. The power supply 1106 may be an alternating current, a direct current, a primary battery, or a rechargeable battery. When the power supply 1106 includes a rechargeable battery, the rechargeable battery may be a wired rechargeable battery or a wireless rechargeable battery. The rechargeable battery may be further configured to support a fast charge technology.

Figure 12:
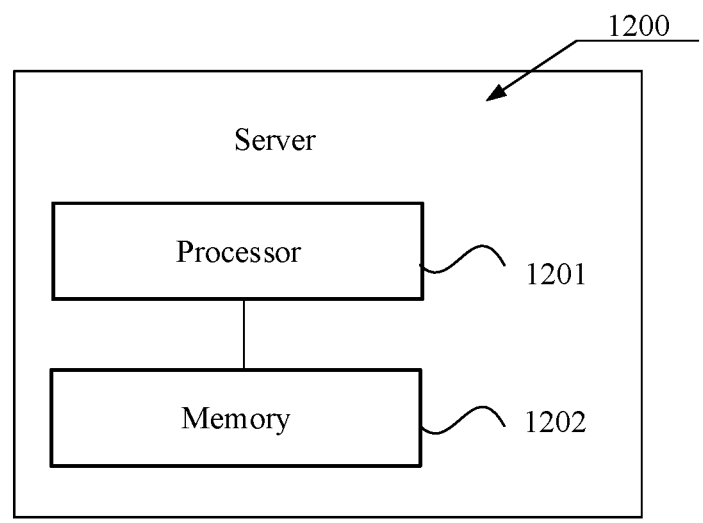
FIG. 12 is a schematic structural diagram of a server according to one or more embodiments of the present disclosure.

A person skilled in the art may understand that the structure shown in FIG. 11 does not constitute a limitation to the terminal 1100, and the terminal may include more components or fewer components than those shown in the figure, or some components may be combined, or a different component deployment may be used The computing device being a server is used as an example for description below. FIG. 12 is a schematic structural diagram of a server according to an embodiment of the present disclosure. The server 1200 may vary greatly because a configuration or performance varies, and may include one or more central processing units (CPU) 1201 and one or more memories 1202. The one or more memories 1202 store at least one program code, and the at least one program code is loaded and executed by the one or more processors 1201 to implement the methods provided in the method embodiments. The server 1200 may also have a wired or wireless network interface, a keyboard, an input/output interface and other components to facilitate input/output. The server 1200 may also include other components for implementing device functions. Details are not described herein again.

In an exemplary embodiment, a computer-readable storage medium, such as a memory including at least one program code, is further provided, and the at least one program code may be executed by a processor to perform the operation control display method based on a virtual scene in the embodiments. For example, the computer-readable storage medium may be a read-only memory (ROM), a random access memory (RAM), a compact disc ROM (CD-ROM), a magnetic tape, a floppy disk, an optical data storage device, or the like.

In certain embodiments, the at least one program code is loaded and executed by the one or more processors, to implement the following operations: obtaining position information of a target virtual object in a virtual scene, the target virtual object being a virtual object controlled by a terminal; determining, based on the position information and at least one of virtual elements in the virtual scene, an element type of a target virtual element corresponding to the target virtual object; and displaying, in a control display region in the virtual scene, a target operation control corresponding to the element type of the target virtual element, the target operation control being configured to control the target virtual object to interact with the target virtual element.

In certain embodiments, the at least one program code is loaded and executed by the one or more processors, to implement the following operations: determining, based on the position information, a position index of a region indicated by the position information; obtaining, based on the position index, a region type of the region from a map index table corresponding to the virtual scene, the map index table including a position index of each region in the virtual scene and a region type of the each region; and determining an element type of a virtual element corresponding to the region type as the element type of the target virtual element.

In certain embodiments, the at least one program code is loaded and executed by the one or more processors, to implement the following operation: determining, based on the position information, an element type of a virtual element closest to the target virtual object from the virtual elements included in the virtual scene as the element type of the target virtual element.

In certain embodiments, the at least one program code is loaded and executed by the one or more processors, to implement the following operations: determining, by using a position indicated by the position information as a center, a target region in the virtual scene; determining a quantity of virtual elements included in each element type in the target region; and determining an element type including a maximum quantity of virtual elements as the element type of the target virtual element.

In certain embodiments, the at least one program code is loaded and executed by the one or more processors, to implement the following operations: determining, by using a position indicated by the position information as a center, a target region in the virtual scene; determining an interactive priority of each virtual element in the target region; and determining an element type of a virtual element having a highest interactive priority as the element type of the target virtual element.

In certain embodiments, the at least one program code is loaded and executed by the one or more processors, to implement the following operations: obtaining, for any control display position in the control display region, candidate operation controls corresponding to the any control display position; matching the element type of the target virtual element with a display condition of each candidate operation control; determining a candidate operation control of which a display condition successfully matches the element type of the target virtual element as the target operation control; and displaying the target operation control at the any control display position.

In certain embodiments, the at least one program code is loaded and executed by the one or more processors, to implement the following operations: determining whether an operation control currently displayed at the control display position is the same as the target operation control; and displaying or continuously displaying the currently displayed operation control when or in response to determining that the operation control currently displayed at the control display position is the same as the target operation control; and switching the currently displayed operation control to the target operation control when or in response to determining that the operation control currently displayed at the control display position is different from the target operation control.

In certain embodiments, the at least one program code is loaded and executed by the one or more processors, to implement the following operations: obtaining the position information of the target virtual object in real time in response to a movement operation on the target virtual object.

In certain embodiments, the at least one program code is loaded and executed by the one or more processors, to implement the following operations: determining a region type of a region indicated by the position information; and performing, in response to a change of the region type, the step of determining, based on the position information and at least one of virtual elements in the virtual scene, an element type of a target virtual element corresponding to the target virtual object.

In some embodiments, a computer program or computer program product including at least one program code is further provided, the computer program or computer program product, when run on a computing device, causing the computing device to perform the operation control display method based on a virtual scene provided in the method embodiments. The details are not described herein.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Persons of ordinary skill in the art may understand that all or some of the steps of the embodiments may be implemented by using hardware, or may be implemented by at least one program code of a program instructing relevant hardware. The program may be stored in a computer-readable storage medium. The storage medium may be a ROM, a magnetic disk, an optical disc, or the like.

The descriptions are merely optional embodiments of the present disclosure, but are not intended to limit the present disclosure. Any modification, equivalent replacement, or improvement made within the spirit and principle of the present disclosure shall fall within the protection scope of the present disclosure.

What is claimed is:

1. An operation control display method based on a virtual scene, applied to a computing device, the method comprising:
    obtaining position information of a target virtual object in the virtual scene, the target virtual object being a virtual object controlled by a terminal;
    determining a region type of a region indicated by the position information;
    determining an element type of a target virtual element in the region based on the region type; and
    displaying, in a control display region in the virtual scene, a target operation control corresponding to the element type of the target virtual element, the target operation control being configured to control the target virtual object to interact with the target virtual element.

2. The method according to claim 1, wherein determining the region type comprises:
    determining, based on the position information, a position index of a region indicated by the position information;

obtaining, based on the position index, the region type of the region from a map index table corresponding to the virtual scene, the map index table including a position index of each region in the virtual scene and a region type of the each region.

3. The method according to claim 1, wherein determining the element type of the target virtual element comprises:
determining, based on the position information, an element type of a virtual element closest to the target virtual object from the virtual elements included in the virtual scene as the element type of the target virtual element.

4. The method according to claim 1, wherein determining the element type of the target virtual element comprises:
determining, by using a position indicated by the position information as a center, a target region in the virtual scene;
determining a quantity of virtual elements included in each element type in the target region; and
determining an element type including a maximum quantity of virtual elements as the element type of the target virtual element.

5. The method according to claim 1, wherein determining the element type of the target virtual element comprises:
determining, by using a position indicated by the position information as a center, a target region in the virtual scene;
determining an interactive priority of each virtual element in the target region; and
determining an element type of a virtual element having a highest interactive priority as the element type of the target virtual element.

6. The method according to claim 1, wherein displaying the target operation control comprises:
obtaining, for any control display position in the control display region, candidate operation controls corresponding to the any control display position;
matching the element type of the target virtual element with a display condition of each candidate operation control;
determining a candidate operation control of which a display condition successfully matches the element type of the target virtual element as the target operation control; and
displaying the target operation control at the any control display position.

7. The method according to claim 6, wherein displaying the target operation control comprises:
determining whether an operation control currently displayed at the control display position is the same as the target operation control; and
displaying the currently displayed operation control in response to determining that the operation control currently displayed at the control display position is the same as the target operation control; and switching the currently displayed operation control to the target operation control in response to determining that the operation control currently displayed at the control display position is different from the target operation control.

8. The method according to claim 1, wherein obtaining position information of the target virtual object comprises:
obtaining the position information of the target virtual object in real time in response to a movement operation on the target virtual object.

9. The method according to claim 8, further comprising:
determining a region type of a region indicated by the position information; and
performing, in response to a change of the region type, the operation of determining, based on the position information and at least one of virtual elements in the virtual scene, an element type of a target virtual element corresponding to the target virtual object.

10. An operation control display apparatus based on a virtual scene, the apparatus comprising:
at least one memory storing computer program instructions; and at least one processor coupled to the at least one memory and configured to execute the computer program instructions and perform:
obtaining position information of a target virtual object in the virtual scene, the target virtual object being a virtual object controlled by a terminal;
determining a region type of a region indicated by the position information;
determining an element type of a target virtual element in the region based on the region type; and
displaying, in a control display region in the virtual scene, a target operation control corresponding to the element type of the target virtual element, the target operation control being configured to control the target virtual object to interact with the target virtual element.

11. The apparatus according to claim 10, wherein the at least one processor is further configured to execute the computer program instructions and perform:
determining, based on the position information, a position index of a region indicated by the position information;
obtaining, based on the position index, the region type of the region from a map index table corresponding to the virtual scene, the map index table including a position index of each region in the virtual scene and a region type of the each region.

12. The apparatus according to claim 10, wherein the at least one processor is further configured to execute the computer program instructions and perform:
determining, based on the position information, an element type of a virtual element closest to the target virtual object from the virtual elements included in the virtual scene as the element type of the target virtual element.

13. The apparatus according to claim 10, wherein the at least one processor is further configured to execute the computer program instructions and perform:
determining, by using a position indicated by the position information as a center, a target region in the virtual scene;
determining a quantity of virtual elements included in each element type in the target region; and
determining an element type including a maximum quantity of virtual elements as the element type of the target virtual element.

14. The apparatus according to claim 10, wherein the at least one processor is further configured to execute the computer program instructions and perform:
determining, by using a position indicated by the position information as a center, a target region in the virtual scene;
determining an interactive priority of each virtual element in the target region; and
determining an element type of a virtual element having a highest interactive priority as the element type of the target virtual element.

15. A non-transitory computer-readable storage medium storing computer program instructions executable by at least one processor to perform:
- obtaining position information of a target virtual object in a virtual scene, the target virtual object being a virtual object controlled by a terminal;
- determining a region type of a region indicated by the position information;
- determining an element type of a target virtual element in the region based on the region type; and
- displaying, in a control display region in the virtual scene, a target operation control corresponding to the element type of the target virtual element, the target operation control being configured to control the target virtual object to interact with the target virtual element.

16. The non-transitory computer-readable storage medium according to claim 15, wherein the computer program instructions are further executable by the at least one processor to perform:
- determining, based on the position information, a position index of a region indicated by the position information;
- obtaining, based on the position index, the region type of the region from a map index table corresponding to the virtual scene, the map index table including a position index of each region in the virtual scene and a region type of the each region.

17. The non-transitory computer-readable storage medium according to claim 15, wherein the computer program instructions are further executable by the at least one processor to perform:
- determining, based on the position information, an element type of a virtual element closest to the target virtual object from the virtual elements included in the virtual scene as the element type of the target virtual element.

18. The non-transitory computer-readable storage medium according to claim 15, wherein the computer program instructions are further executable by the at least one processor to perform:
- determining, by using a position indicated by the position information as a center, a target region in the virtual scene;
- determining a quantity of virtual elements included in each element type in the target region; and
- determining an element type including a maximum quantity of virtual elements as the element type of the target virtual element.

19. The non-transitory computer-readable storage medium according to claim 15, wherein the computer program instructions are further executable by the at least one processor to perform:
- determining, by using a position indicated by the position information as a center, a target region in the virtual scene;
- determining an interactive priority of each virtual element in the target region; and
- determining an element type of a virtual element having a highest interactive priority as the element type of the target virtual element.

20. The non-transitory computer-readable storage medium according to claim 15, wherein the computer program instructions are further executable by the at least one processor to perform:
- obtaining, for any control display position in the control display region, candidate operation controls corresponding to the any control display position;
- matching the element type of the target virtual element with a display condition of each candidate operation control;
- determining a candidate operation control of which a display condition successfully matches the element type of the target virtual element as the target operation control; and
- displaying the target operation control at the any control display position.

* * * * *